(12) United States Patent
Garoff et al.

(10) Patent No.: US 8,143,184 B2
(45) Date of Patent: Mar. 27, 2012

(54) METHOD FOR THE PREPARATION OF OLEFIN POLYMERISATION CATALYST

(75) Inventors: Thomas Garoff, Helsinki (FI); Päivi Waldvogel, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 615 days.

(21) Appl. No.: 11/597,865

(22) PCT Filed: Jun. 2, 2005

(86) PCT No.: PCT/FI2005/000255
§ 371 (c)(1),
(2), (4) Date: May 27, 2008

(87) PCT Pub. No.: WO2005/118655
PCT Pub. Date: Dec. 15, 2005

(65) Prior Publication Data
US 2008/0249263 A1     Oct. 9, 2008

(30) Foreign Application Priority Data

Jun. 2, 2004   (FI) ...................................... 20040755

(51) Int. Cl.
*B01J 31/02* (2006.01)
*B01J 31/04* (2006.01)
*C08F 4/64* (2006.01)
*C08F 4/646* (2006.01)

(52) U.S. Cl. ........ 502/104; 502/103; 502/115; 502/132; 502/133; 526/124.2; 526/348

(58) Field of Classification Search .................. 502/103, 502/104, 115, 132, 133; 526/124.2, 348
See application file for complete search history.

(56) References Cited

U.S. PATENT DOCUMENTS

| 4,004,071 A | 1/1977 | Aishima et al. |
|---|---|---|
| 4,120,883 A | 10/1978 | Sakurai et al. |
| 4,276,191 A | 6/1981 | Karayannis et al. |
| 4,496,660 A | 1/1985 | Gessell et al. |
| 5,180,702 A | 1/1993 | Pettijohn |
| 6,468,938 B1 * | 10/2002 | Govoni et al. ................ 502/126 |

* cited by examiner

*Primary Examiner* — Caixia Lu
(74) *Attorney, Agent, or Firm* — Fay Sharpe LLP

(57) ABSTRACT

The invention is directed to a process for producing an olefin polymerization catalyst wherein a solution of a soluble magnesium complex containing an element of is Group 13 or 14 of the Periodic Table (IUPAC) is contacted with a halogen containing transition metal compound of Group 3 to 10 of the Periodic Table (IUPAC) to obtain a solid catalyst complex comprising as essential components Mg, said element of is Group 13 or 14 of the Periodic Table (IUPAC) and said transition metal compound.

21 Claims, 2 Drawing Sheets

METHOD FOR THE PREPARATION OF OLEFIN POLYMERISATION CATALYST

Figure 1:
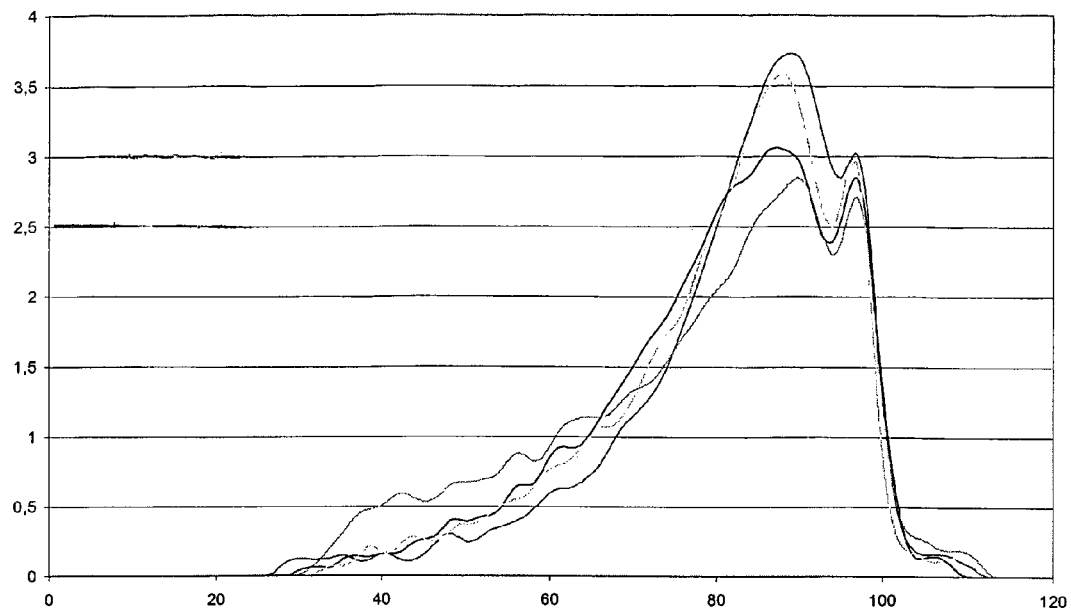

The present invention relates to a Ziegler-Natta catalyst, and preparation process thereof, as well as to the use of the catalyst for polymerising olefins.

BACKGROUND ART

Ziegler-Natta (ZN) polyolefin catalysts are well known in the field of polymers. Generally, they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. ZN catalyst may also comprise (b) further catalyst component(s), such as a cocatalyst and/or an external donor.

Various methods have been developed for preparing ZN catalysts. In one method the catalyst components are impregnated on a particulate support material, such as silica, to obtain a solid ZN catalyst system. For example in WO 01 55230 of Borealis a solution of a chlorine-containing compound, e.g. ethylaluminium dichloride, and a magnesium hydrocarbyloxy compound is first prepared and the obtained solution is impregnated together with a transition metal compound into a porous particulate support.

Solid ZN catalysts, wherein no external support, such as silica, is used, are also known in the field. U.S. Pat. No. 4,496,660 of Dow discloses a catalyst support formed by reacting in an inert diluent (A) the reaction product of (1) an organomagnesium component, (2) an oxygen- and/or nitrogen-containing compound, optionally dissolved or dispersed to a halide containing compound of a transition metal; and (B) a transition metal-free halide source. In the examples the compound (1) is combined with the compound (2) and a halogen-free aluminium compound and then a transition metal compound is added. The obtained solids are then reacted with the compound (B). EP 591 922 of Mitsui discloses a titanium catalyst prepared by contacting (A) a solution of a halogen-containing magnesium compound, an alcohol having at least 6 carbon atoms and a hydrocarbon solvent, with an organoaluminum compound to form a solid complex which is treated with (B) a tetravalent titanium compound.

WO 99 55741 of Fina describes a process for preparing a Ziegler-Natta catalyst by (i) mixing in a hydrocarbon solvent a dialkyl magnesium compound with a chlorinating agent to precipitate a magnesium dichloride derivative. The chlorinating agent is obtainable from the reaction between an alcohol ROH and an alkyl aluminium chloride. The precipitate is washed or reacted to remove unwanted reducing species and the obtained magnesium dichloride derivative is titanated. WO 99 58584 of Borealis describes a further method for preparing a ZN catalyst, wherein a Mg compound is first reacted with an alcohol and the obtained complex is added to a solution of chlorine containing aluminium compound to form a solid reaction product. The obtained slurry is used as such in the next step and to this slurry titanium tetrachloride is added. EP 197 166 of Dow describes a catalyst solution, wherein (A) an organomagnesium compound, (B) an organic OH-containing compound, (C) a reducing halide source of Al or B and (D) a transition metal compound are added in the order (A), (B), (C) and (D); or (A), (B), (D) and (C), and the obtained reaction solution is used as such for the polymerisation.

Accordingly, although much development work has been done in the field of Ziegler-Natta catalysts, there remains a continuing search for alternative or improved methods of producing ZN catalysts with desirable properties.

In addition, it is desired to obtain catalysts resulting in different and/or specific properties of olefin polymers, e.g. desired molecular weight distribution, and, if copolymers are to be prepared, improved co-monomer distribution and co-monomer sensitivity, and even more to have a better control of the balance in lamella thickness and crystallinity of copolymers.

Further, morphology of the solid catalyst is a feature, which affects on the polymer morphology, and thus this feature is to be considered, as well. If solid, supported catalysts are prepared, the external catalyst support, such as silica, has to be selected carefully in order to achieve good morphology for the catalyst. Further, it is known in the art to use as catalyst support Mg dichloride complexes, which are titanated in order to get a final catalyst. By selecting a proper way to prepare such a Mg-complex carrier having desired morphology many desired properties can be achieved. This kind of support preparation method is disclosed in WO 04 055068. An essential step in this preparation process is the washing step of the solid support in order to remove undesired soluble material from the solid support. A disadvantage of this process is that the removed soluble effluent contains valuable catalyst components, which are handled as waste material.

SUMMARY OF THE INVENTION

The present invention provides a process for preparing a solid ZN catalyst without using any external carrier material for olefin polymerization.

Further the present invention provides a solid catalyst having improved properties, especially for producing copolymers, in particular ethylene copolymers with higher α-olefins, such as $C_3$-$C_{10}$ α-olefins.

Still the invention provides a solid ZN catalyst for producing polyolefins having a narrow molecular weight distribution.

Further, the invention provides a catalyst, by which it is possible to produce copolymers of olefins, especially copolymers of ethylene, having an improved co-monomer distribution.

Further, the invention provides a catalyst having high activity, especially in producing olefin copolymers, and a improved sensitivity in respect of comonomers.

The present invention provides a method for producing a solid ZN catalyst economically and in an environmentally acceptable way.

A further aspect of the invention is to provide an olefin polymerisation process, and in particular an olefin copolymerization process, using the ZN catalyst prepared according to the preparation process of the invention.

DESCRIPTION OF THE INVENTION

It has now surprisingly been found that a solid ZN catalyst having the properties disclosed above can be prepared from a Mg-complex, which is soluble in hydrocarbons, by precipitation the complex by addition of transition metal compound in a specific mol ratio of components. Due to the precipitation, no external solid support is needed, as is the case in WO 01/55230, which discloses a preparation of a liquid catalyst, which is then impregnated on an external carrier. The obtained precipitated catalyst of the invention has surprising properties and combination of properties, which are not achieved by the catalysts described above. Especially surprising is that the polymer produced with the catalyst has a narrow MWD and if copolymers are produced an improved comonomer distribution is achieved.

The soluble Mg complex used as starting material in the catalyst preparation of the invention comprises components in addition of Mg, element of Group 13 or 14 of the Periodic Table (IUPAC), preferably aluminium, $(OR_1)$, $R_1$ and X, where each $R_1$ are independently a $C_{1-20}$ hydrocarbyl group, X is halogen, preferably Cl. In particular the complex has the chemical formula (I) $[R_1—Al(OR_1)_2]_a—[MgCl_2]_b$, where the ratio a/b is 1.5 to 2.5, i.e. the molecular ratio of Al/Mg is 1.5 to 2.5. As one example of such a complex is formula $[EtAl(OR_1)_2)]_2[MgCl_2]$. This kind of soluble complex will precipitate, when a transition metal compound, preferably Ti compound, especially $TiCl_4$, is added into the solution in a specific mol ratio. The formula (I) falls within the general formula (3) of the publication WO 01/55230. However, according to that patent a liquid catalyst composition was prepared, which composition was impregnated into a porous carrier, i.e. no precipitation occurred by adding Ti-compound to the liquid. None of the examples of said publication disclose the use of soluble Mg-complex of formula (I) for preparation of precipitated catalyst of the present invention. It has now been found that the molar ratios of the components in the complex have effect on the solubility of the complex.

Catalyst of the invention can be prepared by direct precipitation of the soluble Mg-complex. Precipitation is done preferably by addition of $TiCl_4$ into the soluble complex. This kind of complex can be prepared by forming first a Mg-alcoholate, which is then allowed to react with the halogen-containing compound of Group 13 or 14 of the Periodic Table. Preferably this is a chlorine-containing compound of Group 13 of the Periodic Table, preferable a compound of formula $Al(R_1)_xX_{3-x}$ (IV), wherein each $R_1$ independently represents a $Cl_{1-20}$ hydrocarbyl group; X is chloride and $0 \leq x < 3$. As example it can be ethyl aluminium di chloride (EADC).

One additional way of getting the soluble Mg-complex of formula (I) for preparation of the catalyst of the invention, is the use of the washing solution, which is formed when a solid Mg complex support is prepared according to WO 04 055068 cited above, and which solution is until now handled as a waste material. This support preparation process is carried out as disclosed below. The more detailed process description is disclosed in said reference above.

The solid reaction product, i.e. solid support, according to WO 04 055068, is formed from a solution of magnesium hydrocarbyloxy compound and a halogen-containing compound of an element of Group 13 or 14 of the Periodic Table (IUPAC, Nomenclature of Inorganic Chemistry, 1989, used also below), and as a result a solid product, i.e. a catalyst support material, is obtained, which is recovered from the reaction mixture by separating the solid product from the liquid reaction medium and/or by washing the product before it is used as a support material. The insoluble Mg-complex remains in the solid support, whereas the soluble Mg-complex is washed away. The obtained support material can then be treated with further catalytically active compound(s), such as with one or more transition metal compounds, to obtain a catalyst component for olefin polymerisation.

The washing solution can now be used in the preparation of the catalyst of the present invention. As mentioned above, during said washing step a soluble Mg-complex will be washed away. The soluble complex has the general formula (I) above. It has been noted that the amount of Mg in this soluble complex represents a high amount of the Mg added in the support synthesis through the $Mg(OR_1)_2$ complex. The amount is even one third or even more of the added Mg. In addition to Mg, the waste liquid contains about ⅔ of the added amount of Al. Until now, this soluble complex material has been regarded as waste material, and treated accordingly. This is naturally very uneconomical, and in environmental point of view not at all desired.

Now, it has been surprisingly found that this waste material is a valuable raw material for the preparation a ZN catalyst of the invention. In addition, the catalyst prepared from this solution containing the soluble Mg-complex has many very beneficial and specific properties, which have not been found in supported catalysts.

According to the present invention the soluble Mg-complex of formula (I) can be turned into a valuable catalyst by addition of $TiCl_4$ into the solution in an amount which causes precipitation. In addition it has been found that the amount of the added $TiCl_4$ effects on many properties of the catalyst and the produced polymer. If as a starting material is used the washing solution containing the soluble Mg-complex as described above, it is possible to use close to 100% of the Mg in the washing liquid for the catalyst preparation of the present invention. Further, there is no need for any purification of the solvents used e.g. in the solid support synthesis, which makes the catalyst preparation of the invention very simple. Further, the addition of $TiCl_4$ to the complex solution can be done even at room temperature, which makes the precipitation step even more economical. Use of higher temperatures is, however, advantageous in some embodiments.

In addition, because the present catalyst preparation is a so called one step synthesis, i.e. all the catalyst components are precipitated out from the solvent at the same time, the process is technically very simple to carry out.

The washing solution used in the invention is obtained from one or more washing steps of the solid support material. The wash temperature can be e.g. 0-100° C., suitably 20-100° C., e.g. 40-80° C., such as 55-70° C.

The catalyst support to be washed, and thus also the raw material for the catalyst preparation according to the one embodiment of the invention, comprises a reaction product formed at least from 1) Compound (1): A magnesium hydrocarbyloxy compound of a general formula (II):

$$Mg(OR_1)_{2-n-x}(R_1)_nX_x \quad \quad (II),$$ 

wherein each $R_1$ is independently a $C_{1-20}$ hydrocarbyl group, e.g. a $C_{2-15}$ group, preferably a $C_{3-10}$ group, such as a $C_{4-10}$ group, suitably a $C_{4-10}$ group e.g. an alkyl, cycloalkyl, alkylcycloalkyl, cycloalkylalkyl, aryl, arylalkyl, or alkylaryl, wherein "alkyl" used as alone or as part of another option can be linear or branched and "aryl" is preferably of 5-12 carbon ring atoms, suitably phenyl or naphthyl; e.g. each $R_1$ is independently an ethyl, propyl, butyl, pentyl, hexyl, heptyl, octyl; each X is independently a halogen, preferably chlorine; $0 \leq n < 2$ and n may or may not be an integer; $0 \leq x < 2$ and may or may not be an integer; and the sum of (2−n), n and x is 2. In a one embodiment, a magnesium hydrocarbyloxy compound of formula $Mg(OR_1)_{2-n-x}(R_1)_nX_x$ (II), wherein each $R_1$ and X are independently as defined above; x is 0 and $0 \leq n < 2$, is used, which may be commercially available or, preferably, is a reaction mixture of a magnesium alkyl compound of formula $Mg(R_1)_2$ (III), wherein each $R_1$ independently is as defined above, with an alcohol $R_1OH$, wherein $R_1$ is as defined above; and 2) Compound (2): A halogen-containing compound of an element of Group 13 or 14 of Periodic Table (IUPAC), which is preferably a compound of Group 13, such as a halogen-containing aluminium or boron compound. Halogen is e.g. chlorine, bromine or iodine, preferably chlorine. In one preferred embodiment said compound is of formula (IV):

$$Al(R_1)_xX_{3-x} \quad \quad (IV),$$

wherein each $R_1$ is independently as defined above in formula (II), and particularly in case of formula (III) an alkyl of up to 6, such as up to 4, carbon atoms; and each X is independently a halogen, such as chlorine; $0 \leq x < 3$ and x may or may not be an integer; e.g. dialkyl aluminium chloride, such as dimethyl aluminium chloride, diethyl aluminium chloride, diisobutyl aluminium chloride, or alkyl aluminium dichloride, such as ethyl aluminium dichloride (EADC) or methyl aluminium dichloride;

The molar ratio of the element of compound (2) to Mg used may be between 0.5:1 and 2:1, preferably 0.8:1 to 1.2:1, such as 1:1, when the support is prepared.

The term "solution" is understood herein broadly to include solutions prepared from (a) one or more of the support forming compounds in liquid form (liquid at the room temperature or a melt prepared at a higher temperature), and/or (b) from an organic solvent(s).

The solutions are suitably formed using an organic solvent that dissolves the compounds. Preferred solvents include inert hydrocarbons, e.g. linear or branched aliphatic, alicyclic or aromatic $C_{5-20}$ hydrocarbons, preferably $C_{6-12}$ hydrocarbons, wherein the ring systems may contain hydrocarbon, e.g. $C_{1-6}$ alkyl substituents, such as cyclohexane, hexane, heptane, octane or toluene, or any mixtures thereof. E.g. linear or branched alkanes, e.g. hexane, heptane or octane, may be used.

As the washing solution, e.g. any organic solvent or mixtures thereof known in the art can be used. Preferable solvents include hydrocarbons as defined above, e.g. pentane, hexane or heptane, particularly heptane.

The catalyst of the invention is obtained, as disclosed above, by precipitating the soluble Mg-complex of formula (I) by a transition metal compound of Group 4 to 10, preferably of Group 4 to 6, more preferably of Group 4, of the Periodic Table (IUPAC). The transition metal compound is suitably a Ti compound. Particularly, a tetravalent Ti compound can be used and most preferably $TiCl_4$.

The precipitation starts immediately or after a short time after the adding of $TiCl_4$ and is dependent on added amount of $TiCl_4$, i.e. the Ti/Mg ratio in the addition. Further, the settling time of the precipitate is dependent on this ratio.

Further, Ti/Mg ratio in addition effects on catalyst activity in polymerization.

It has been noted that the more $TiCl_4$ is added into the catalyst synthesis, the more Ti is tied up in the catalyst, i.e. Ti/Mg ratio in the catalyst becomes higher, as long as the added amount of $TiCl_4$ is below or about the stoichiometric amount in respect of Mg. I.e. when the $TiCl_4$/Mg ratio increases from zero to the stoichiometric ratio of about 1:1, changes in the chemical composition of the catalyst can be seen, but if the amount of added $TiCl_4$ becomes higher, only minor changes can be seen. Therefore it is clear that it is no need to use excess of $TiCl_4$ in the catalyst preparation of the invention.

Preparation of the catalyst of the present invention is technically not a complicated process. $TiCl_4$ is added to the solution of soluble Mg-complex of formula (I) at a temperature of 10 to 70° C., preferably at 10 to 60° C., and more preferably at 10 to 40° C., preferably at a temperature of 20 to 30° C., i.e. at about a room temperature during mixing. Higher temperatures are often used, when direct precipitation of soluble Mg-complex is carried out, i.e. when Mg-complex is prepared by synthesising. Mixing is preferably continued during the whole precipitation process. If mixing conditions are to be improved, then some additional solvent, such as hydrocarbon solvents of the same type used in the Mg-complex synthesis, can be added into the mixture. In a preferred embodiment the precipitation starts immediately. Separation of the precipitated catalyst can be improved, if needed, by adding a hydrocarbon solvent, e.g. pentane. After settling the clear liquid will be removed off by siphoning or filtering or by any of as such known separation methods. The obtained catalyst slurry is ready for using in the polymerization. Washing of the catalyst has effects on the Al/Ti ratio of the catalyst.

The obtained catalyst has the chemical formula (V) $[MgCl_2]_x(TiCl_4)[EtAl(OR_1)_2)]_y$, where $R_1$ is as defined earlier in this description. Ti—Cl and Al—Et groups may have reacted totally or partly with each other creating Ti(III) and Al—Cl groups. X is 1-2, y is 0.5-2. Ti—$OR_1$ groups may have formed from exchange reaction between Ti—Cl and Al—$OR_1$ groups.

The obtained catalyst of the invention can be used for olefin polymerization. In a preferred embodiment the catalyst is used for ethylene homo or copolymerization. Especially the present catalyst is very suitable for ethylene copolymerization, in particular ethylene copolymerization with higher α-olefins, such as $C_{4-10}$ olefins, preferably $C_{4-8}$, more preferably $C_{4-6}$ olefins, in particular butene, providing specific and improved properties for the polymer.

$TiCl_4$ is added to said solution of soluble Mg complex in an amount, where the molar ratio of Ti/Mg is in the range of 0.1 to 3.0. However, the Ti/Mg ratio in the $TiCl_4$ addition effects on the catalyst and polymer properties and combinations thereof. It has been found that the optimal Ti/Mg ratio in addition is between 0.5-1.5, more preferably between 0.5-1.1, and in one preferred embodiment between 0.7-1.1.

The Mg/Ti mol/mol·ratio of the catalyst will thus be in the range of 0.5 to 5, preferably between 1 to 3, more preferably between 1.0 to 2.0. Molar ratio of Al/Ti is in the catalyst complex in the range of 0.2 to 4.0, preferably in the range of 0.3 to 2.5, and more preferably in the range of 0.3 to 2.0, and in one preferred embodiment from 0.3 to 1.5.

If the ratio of Ti/Mg in addition is lower, e.g. below 0.5, (i.e, the amount of added $TiCl_4$ is smaller), the catalyst activity is not satisfactory and in addition many other properties are not on desired level. If the ratio is higher, e.g. more than 2, there are no problems with the activity, but e.g. the amount of xylene solubles will increase to a level, which is usually not desired. XS values within the optimal range are below 1.8% preferably below 1.0%, more preferably below 0.8%. In addition some properties of polymers tend to turn into worse direction. Therefore the optimal ratio ranged is defined as above. However, higher XS values are also possible and sometimes desired according to the invention.

Within said optimal addition ratio the activity of the catalyst is at least at a reasonable level in ethylene homopolymerization, being higher than 150 kgPE/gTi. However, it should be noted that the activity can be very high in ethylene copolymerization, being even higher than 350 kgPE/gTi, and activities even more than 650 kgPE/gTi were achieved in some test runs, when the Ti/Mg ratio was in the preferable range. Naturally, as is known, activities are effected by many reasons, and thus activity can vary in the test runs.

By using the catalyst of the invention, the molecular weight distribution (MWD) of homopolymer will be at a level below 10, preferably below 8, usually being however higher than 4.

However, what is notable, ethylene copolymers obtained by the catalyst of the invention, have a very narrow MWD, being below 4, preferable below 3.8, when the butene comonomer amounts are of 2 to 4.5. MWD can be preferably in the range of 2 to 4, more preferably 2 to 3.8. MWD values of 3 or a bit higher, e.g. 3 to 3.5 are well obtainable by the catalyst of the invention, when ethylene copolymers with butene amounts of 2.5 to 4.5 wt-%, preferable 3.0 to 4.0 are prepared. This kind of narrow MWD are hardly obtainable by conventional ZN catalysts with the same amounts of comonomer.

One additional important feature achieved by the present catalyst is the comonomer sensitivity. The smaller the Mg/Ti ratio of the catalyst was, the higher the comonomer sensitivity was. Within the optional Mg/Ti range the amounts of comonomer ($C_4$) up to 5 wt-% are well obtainable. Many beneficial properties were achieved, when the comonomer amount was in the range of 3 to 4.5. The TREF analysis shows good co-monomer distribution of comonomers in ethylene polymer, see FIG. 1.

If the catalyst of the invention is compared to a conventional silica supported ZN catalyst, it can be seen that the densities of ethylene-butylene copolymers are systematically below the values obtained silica supported catalysts with all $C_4$-comonomer amounts measured. The same trend is with XS values of the same polymers. See FIGS. 2 and 3.

The following figures show some most important features of the catalyst of the invention.

FIG. 1: Shows TREF curves for copolymers produced by using catalyst of the invention within the defined optimal Ti/Mg ratio and with the Ti/Mg ratio higher than the optimal value.

Figure 2:
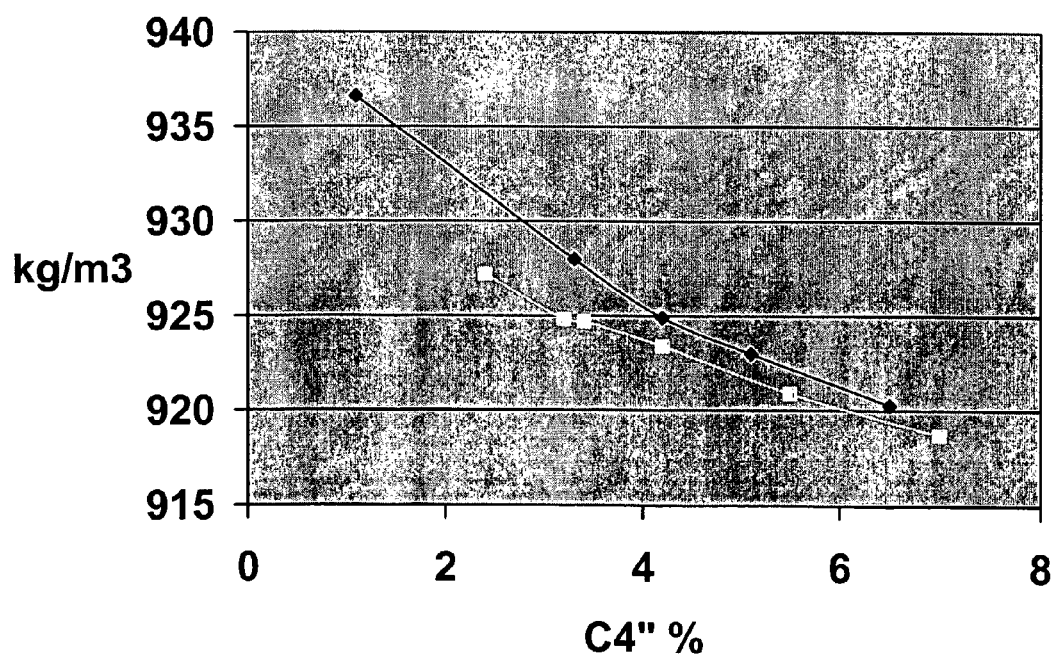

FIG. 2: Shows a comparison of densities of ethylene-butylene copolymers prepared by using conventional silica-based catalyst and catalyst produced of the invention.

Figure 3:
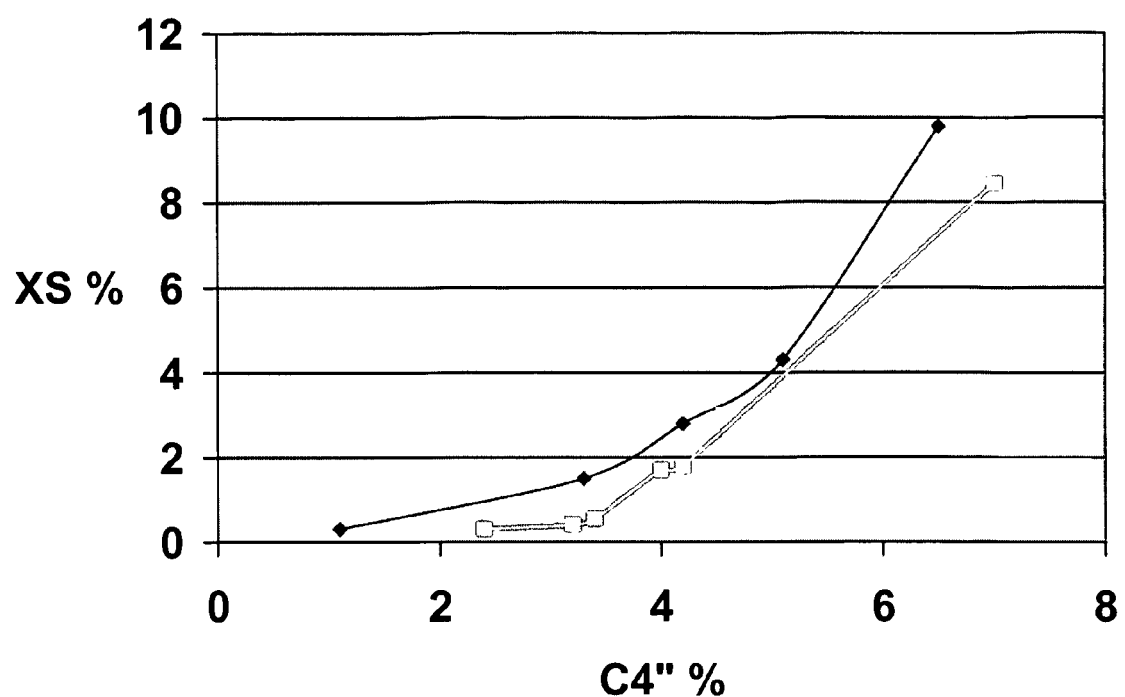

FIG. 3: Shows a comparison of xylene soluble fractions (XS) of ethylene-butylene copolymers prepared by using conventional silica-based catalyst and catalyst of the invention.

POLYMERISATION PROCESS

The catalyst particles of the invention can be used as such or together with a separate cocatalyst and/or an electron donor, as a Ziegler-Natta catalyst for the (co)polymerisation of an olefin in a manner known in the art. It is also possible to combine said catalyst with one or more other ZN and/or non-ZN catalysts.

The olefin to be polymerised using the catalyst system of the invention can be any olefin polymerisable in a coordination polymerisation including an alpha-olefin alone or a mixture of one or more comonomers. Preferable olefins are alpha-olefins, e.g. ethylene or propene, or a mixture of ethylene or propene with one or more alpha-olefin(s), most preferably the olefin is ethylene which can be copolymerized with higher α-olefins as disclosed earlier in this specification.

Polymerisation may be effected in one or more, e.g. one, two or three polymerisation reactors, using conventional polymerisation techniques, in particular gas phase, solution phase, slurry or bulk polymerisation. Polymerisation can be a batch or continuous polymerisation process. Generally a combination of slurry (or bulk) and at least one gas phase reactor is preferred, particularly with gas phase operation coming last.

For slurry reactors, the reaction temperature will generally be in the range of 40 to 110° C. (e.g. 60-110° C.), the reactor pressure will generally be in the range 5 to 80 bar, preferably in the range of 20 to 70 bar (e.g. 50-60 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may, if desired, be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours.

Generally the quantity of catalyst used will depend upon the nature of the catalyst, the reactor types and conditions and the properties desired for the polymer product. Conventional catalyst quantities, such as described in the publications referred herein, may be used.

EXAMPLES

The following examples are provided by way of illustration of the invention. All the used starting materials and solvents are commercially available or can be prepared according or analogously to methods described in the literature.

Examples

The following measurement methods were used in the analysis:

$MFR_2$: ISO 1133 (190° C., 2.16 kg load)
$MFR_5$: ISO 1133 (190° C., 5.0 kg load)
$MFR_{21}$: ISO 1133 (190° C., 21.0 kg load)
BD: ASTM D 1895V
MWD: Gel permeation chromathograph, GPC
XS: ISO 6427
Density: ISO 1183-1987
$C_4$%: measured by IR
Tm: Diffrential scanning calorimetry (DSC), Mettker Toledo DSC 822 with heating and cooling rate of 10° C./min.
DSC %: From DSC comparing the heat fusion of a perfectly crystalline polyethylene.

Determination of Ti, Mg and Al:

Samples were taken from the washed support material and from the catalyst.

The Al and Mg containing carrier samples and the Ti and Al containing catalyst samples were dissolved in a mixture of nitric and hydrofluoric acid and the metals were measured by flame atomic absorption with a nitrous oxide/acetylene flame.

Determination of $Ti^{4+}$ and $Ti^{3+}$:

For the determination of $Ti^{3+}$ the sample is dissolved in hydrochloric acid and $Ti^{3+}$ is determined titrimetrically with a standard ferric sulphate solution with potassium tiocyanate as indicator (titration A):

$$Ti^{3+}+Fe^{3+}=Ti^{4+}+Fe^{2+}$$

$$Fe^{3+}+SCN^-=Fe(SCN)^{2+} \text{ (red colour)}$$

For the determination of $Ti^{4+}$ (titration B) a second sample is dissolved in hydrochloric acid and $Ti^{4+}$ is reduced to $Ti^{3+}$ by running the solution trough a zinc amalgam reductor. $Ti^{3+}$ is determined titrimetrically as in titration A. In this titration the sum of $Ti^{3+}$ and $Ti^{4+}$ in the sample is determined. $Ti^{4+}$ is obtained by subtracting the result from titration A from that of titration B:

$$2Ti^{4+}+Zn\text{---}Hg=2Ti^{3+}+Zn^{2+}\text{---}Hg$$

$$Ti^{3+}+Fe^{3+}=Ti^{4+}+Fe^{2+}$$

$$Fe^{3+}+SCN^-=Fe(SCN)^{2+} \text{ (red colour)}$$

Examples 1-7

Strict inert conditions, i.e. $O_2$ and $H_2O$ free conditions have been used in all steps of these synthesis.

Preparation of the Mg-Alcoholate Complex, Method 1

The Mg-alcoholate was prepared in a larger batch. About 83 kg of the Mg-alcoholate complex was produced. The Mg-alcoholate complex synthesis was started by adding 63.4 kg (86.28 l, 76.18 mol Mg) of 20.2% heptane solution of $(C_4H_9)_{1.5}Mg(C_8H_{17})_{0.5}$ (BOMAG, 2.92% Mg) into a 150 l multi purpose reactor at room temperature. To this solution 20.00 kg (24.03 l, 151.89 mol) of 2-ethyl-hexanol (98.9% EHA) was added slowly at room temperature. The Mg/EHA molar ratio in this mixture was 1:1,994. The temperature was held at about room temperature and the reactants were allowed to react with each other for 2 h. The Mg-alcoholate complex had a concentration of 2.22% Mg.

Preparation of the Mg Complex for the Catalyst Synthesis 32.2 g (43.1 mmol EADC) of a 17 w-% pentane solution of EADC was added into a glass reactor. The temperature was then adjusted to 10° C. and mixing speed to 460 rpm. At this temperature 47.0 g of the Mg-complex as prepared above (Mg w-% 2.22, 42.9 mmol Mg) was added at a feeding rate of 1.2-1.7 ml/min. The addition took 50 min. After this the temperature was increased to 60° C. and the reactants were allowed to react with each other for 70 min. Mixing speed was 460 rpm. The Al/Mg molar ratio in the reaction mixture was 1:1. After reaction, the precipitate was allowed to settle for 30 min. The clear liquid was siphoned off and used as Mg source in the following catalyst synthesis. This synthesis of the Mg complex was done twice. In the first synthesis the liquid (Liquid A) had a composition of 1.55% Al and 0.82% Mg and in the second (Liquid B) 1.46% of Al and 0.74% of Mg.

Preparation of the Catalysts

Seven catalysts were prepared in this test series. First 5-12 g of the Mg complex was weighted into a 50 ml septa bottle. Mixing was provided by a magnetic rod. Liquid A was used in the first five synthesis, Liquid B in the two last synthesis. After this the $TiCl_4$ was added. The amounts of $TiCl_4$ were chosen so that there was a successive increase in the Ti/Mg molar ratio of the addition from about 0.3 to 3 in this test series. The amounts of the reagents added into the synthesis are listed in Table 1. To improve mixing conditions 5 ml of pentane was added to the reaction slurry. The components were then allowed to react with each other at room temperature over night. The same mixing rate was used all the time. Next morning 45 ml of pentane was added to provide a good separation possibility between the precipitate and the clear liquid. After settling the clear liquid was siphoned off and samples of the catalyst slurry were taken for composition analysis and for test polymerisation. The chemical composition of the catalysts of the examples 1-7 are disclosed in table 2.

Polymerisations

Homopolymerisation of Ethene at High MFR:

A 3 l autoclave reactor was used. 1800 ml (1.127 kg, 15.6 mol) of pentane was introduced into the reactor as reaction medium. After adding the polymerisation medium the temperature of the reactor was adjusted to 90° C. The co-catalyst and the catalyst were fed into the reactor by means of two feed vessels, which were connected on line to the reactor lid. About 5-10 mg of the studied catalyst in an appropriate slurry volume was added into the upper feed vessel together with 10 ml (6.3 g, 87 mmol) of pentane. A 10 w-% heptane solution of tri-ethyl-aluminium (TEA) was used as co-catalyst. The co-catalyst was added to the lower feed vessel. An Al/Ti molar ratio of 15 was used in the homo-polymerisations (about 0.5 ml TEA). The co-catalyst was first let into the reactor and the catalyst was after that introduced by pressurising the upper feed vessel to 7 bar with $N_2$ and then letting the over pressure push in the catalyst in to the reactor. The manoeuvre was done three times. One additional 500 ml feed vessel was connected in series between the lid of the reactor and the ethene monomer feed line. 17.5 bar of $H_2$ pressure was added to this feed vessel (390 mmol). 390 mmol corresponded to the so called high MFR homo polymerisation. The polymerisation was started by opening the monomer feed line and thereby introducing both the $H_2$ together with the ethene monomer. A total pressure of 13.7 bar was maintained by the ethene feed trough out the polymerisation. The polymerisation was carried out for 1 h at 90° C. The polymerisation was stopped by venting off the monomer and the pentane.

Polymerisation results are disclosed in Table 3.

Ethene-Butene Co-Polymerisation

Butene ($C_4"$) was used as co-monomer in the co-polymerisation. A 3 l autoclave reactor was used. 1800 ml (987 g, 17.0 mol) of iso-butane was introduced into the reactor as reaction medium. After adding the polymerisation medium the temperature of the reactor system was set to 85° C. The catalyst and the co-catalyst were fed into the reactor by means of two feed vessels that were connected in line to the reactor lid. About 250 mg of the catalyst oil slurry (0.3 ml, 10 mg catalyst) was added into the upper feed vessel together with 10 ml (6.3 g, 87 mmol) of pentane. A 20 w-% heptane solution of tri-ethyl-aluminium (TEA) was used as co-catalyst. A Al/Ti molar ratio of 5-100 was used in the co-polymerisation. The appropriate amount of TEA to be added was calculated based on the weighted amount of catalyst slurry. The co-catalyst was first let into the reactor and the catalyst was after that introduced by pressurising the upper feed vessel to 30 bar with $N_2$ and there after letting the over pressure push in the catalyst in to the reactor. This manoeuvre was done three times. Two additional feed vessels were connected in series between the lid of the reactor and the ethene monomer feed line. 150 ml (89.3 g, 1.59 mol) or less of butene co-monomer was introduced into the lower feed vessel, in order to achieve a co-polymer containing between 3-4% of butane-co-monomer. 1 bar of $H_2$ pressure was added to the upper 500 ml feed vessel (22.3 mmol). The polymerisation was started by opening the monomer feed line and thereby introducing both the co-monomer and the $H_2$ together with the ethene monomer. Partial pressure of added ethene was 6.7 bar (normally 7.8 bar is used). A pressure of about 22.5 bar was maintained by the ethene feed trough out the test polymerisation. The co-polymerisation was carried out at 85° C. The co-polymerisation was continued until 200 g of co-polymer was produced. The polymerisation was stopped by venting off the monomer and the iso-butane.

Dried samples of the catalysts were used in the co-polymerisations.

Polymerisation results are disclosed in Table 4.

TABLE 1

The added amounts of reagents when preparing the catalysts of the invention

| Catalyst example | w-% Mg in complex | Mg(OR)$_2$ Added (g) | Mg Added (mg) | Mg added in mmol | TiCl$_4$ added in ml | TiCl$_4$ added in g | TiCl$_4$ added in mmol | Ti/Mg in addition |
|---|---|---|---|---|---|---|---|---|
| 1 | 0.82 | 8.1546 | 66.868 | 2.7518 | 0.11 | 0.1899 | 1.0000 | 0.36 |
| 2 | 0.82 | 6.9645 | 57.109 | 2.3502 | 0.14 | 0.2416 | 1.2732 | 0.54 |
| 3 | 0.82 | 7.1596 | 58.709 | 2.4160 | 0.19 | 0.3279 | 1.7280 | 0.72 |
| 4 | 0.82 | 5.5027 | 45.122 | 1.8569 | 0.22 | 0.3797 | 2.0010 | 1.08 |
| 5 | 0.82 | 4.277 | 35.071 | 1.4433 | 0.23 | 0.3970 | 2.0922 | 1.45 |
| 6 | 0.74 | 10.943 | 80.978 | 3.3324 | 0.80 | 1.3808 | 7.2768 | 2.18 |
| 7 | 0.74 | 11.575 | 85.655 | 3.5248 | 1.05 | 1.8123 | 9.5529 | 2.71 |

Chemical Composition of Catalysts and Polymerisation Results

In Table 2 the chemical composition of the catalysts are listed, in Table 3 the results from the homopolymerisation and in Table 4 the results from the co-polymerisations. Examples 1H-7H, and 1C-7C refer to the results of polymers obtained in homo- and copolymerizations by using catalysts of examples 1-7. Examples 1, 6 and 7 are within the general scope of the invention, however being non-preferred examples.

TABLE 2

Chemical composition of the catalysts of the invention.

| | Example | | | | | | |
|---|---|---|---|---|---|---|---|
| | 1 | 2 | 3 | 4 | 5 | 6 | 7 |
| Ti/Mg in addition | 0.36 | 0.54 | 0.72 | 1.08 | 1.45 | 2.18 | 2.71 |
| Al, w-% | 0.44 | 0.34 | 0.31 | 0.31 | 0.31 | 0.60 | 0.59 |
| Mg, w-% | 0.53 | 0.37 | 0.30 | 0.64 | 0.78 | 0.62 | 0.70 |
| Ti, w-% | 0.25 | 0.34 | 0.37 | 1.16 | 1.52 | 1.56 | 1.85 |
| Al/Ti | 3.12 | 1.77 | 1.49 | 0.47 | 0.36 | 0.68 | 0.57 |
| Mg/Ti/cat | 4.18 | 2.14 | 1.60 | 1.09 | 1.01 | 0.78 | 0.75 |
| Ti$^{2+}$, w-% | 0.01 | 0.01 | 0.06 | 0.07 | 0.15 | 0.16 | 0.22 |
| Ti$^{3+}$, w-% | 0.07 | 0.13 | 0.13 | 0.55 | 0.73 | 0.60 | 0.59 |
| Ti$^{4+}$, w-% | 0.17 | 0.20 | 0.18 | 0.54 | 0.64 | 0.81 | 1.04 |
| Ti$^{2+}$ % | 4 | 3 | 16 | 6 | 10 | 10 | 12 |
| Ti$^{3+}$ % | 28 | 38 | 35 | 47 | 48 | 39 | 32 |
| Ti$^{4+}$ % | 68 | 59 | 49 | 47 | 42 | 52 | 56 |

TABLE 3

Homo polymerisation results with the catalysts of the invention

| | Example | | | | | | |
|---|---|---|---|---|---|---|---|
| | 1H | 2H | 3H | 4H | 5H | 6H | 7H |
| Ti/Mg in addition | 0.36 | 0.54 | 0.72 | 1.08 | 1.45 | 2.18 | 2.71 |
| Activity kg PE/g Ti | 69 | 175 | 208 | 161 | 153 | 172 | 155 |
| MFR$_2$ | 10 | 48 | 45 | 48 | 55 | 37.84 | 56.5 |
| % > 2 mm | 0 | 0 | 0.2 | 0.2 | 0 | 0.2 | 0.1 |
| APS mm | 0.16 | 0.23 | 0.3 | 0.3 | 0.24 | 0.36 | 0.39 |
| MWD | 5 | 6.8 | 5.6 | 6.6 | 8.3 | 6.9 | 9.7 |
| Al/Ti in polymeris. | 10 | 11 | 12 | 10 | 10 | 9 | 7 |

TABLE 4

Co-polymerisation results with the catalysts of the invention.

| | Example | | | | | | |
|---|---|---|---|---|---|---|---|
| | 1C | 2C | 3C | 4C | 5C | 6C | 7C |
| Ti/Mg in addition | 0.36 | 0.54 | 0.72 | 1.08 | 1.45 | 2.18 | 2.71 |
| Activity kg EB/g Ti | 105 | 352 | 669 | 616 | | 715 | 753 |
| MFR$_5$ | 0.53 | 0.70 | 1.39 | 1.71 | | 1.48 | 1.85 |
| MFR$_{21}$ | 2.71 | 5.34 | 7.2 | 10.5 | | 10.8 | 10.58 |
| C$_4$" % | 2.4 | 3.2 | 3.4 | 4.2 | | 5.5 | 7 |
| MWD | 3.1 | 3.1 | 3.2 | 3.7 | | 4.4 | 4.9 |
| Dens kg/m$^3$ | 927.2 | 924.8 | 924.7 | 923.4 | | 920.9 | 918.7 |
| XS % | 0.3 | 0.0 | 0.55 | 1.79 | | 7.64 | 8.45 |
| T$_m$ ° C. | 123.8 | 120.1 | 120.0 | 119.6 | | 119.9 | 119.6 |
| DSC % cryst | 46.6 | 45.2 | 44.5 | 40.3 | | 38.3 | 36.2 |
| Al/Ti in Polymeris. | 6 | 6 | 12 | 9 | | 10 | 9 |

The following examples of the invention show additional embodiments for preparing soluble Mg-complex and precipitating it by addition of TiCl$_4$ in order to get solid catalysts.

Preparation of the Mg-Alcoholate Complex, Method 2.

The Mg-alcoholate was prepared in a larger batch. The same Mg-alcoholate complex was then used in all of the five catalyst synthesis below, examples 8-12. About 24 kg of the Mg-alcoholate complex was produced. The Mg-alcoholate complex synthesis was started by adding 16.0 kg (472 g Mg, 19.42 mol Mg) of 20% heptane solution of (C$_4$H$_9$)$_{1.5}$Mg (C$_8$H$_{17}$)$_{0.5}$ (BOMAG, 2.95% Mg) into a reactor at room temperature. To this solution 4.921 kg (37.79 mol) of 2-ethylhexanol (EHA) was added slowly at room temperature. The Mg/EHA molar ratio in this mixture was 1:1,945. The temperature was held at room temperature and the reactants were allowed to react with each other for 108 min. 3.757 kg (52.1 mol) of n-pentane was added at room temperature to reduce viscosity and the Mg-alcoholate complex was allowed to stabilise for 120 min at 20-30° C. After this the Mg-alcoholate solution was allowed to temperate back to room temperature. Analyses showed that the Mg-alcoholate complex (Mg (OR)$_2$) had a concentration of 2.23% Mg. Density of the Mg-alcoholate complex was 0.738 g/ml.

Preparation of the Catalysts

Example 8

20.793 g (34.0 mmol) of 20 w-% pentane solution of di-ethyl-aluminium-chloride (DEAC or $Et_2AlCl$) was added to a glass reactor at room temperature. Stirring was set to 245 rpm. Next, 5.34 ml (34.0 mmol) of 2-ethyl-hexanol was added drop by drop at room temperature. The addition took 17 min. Temperature was increased to 60° C. and the reactants were allowed to react with each other for 30 min at that temperature, after which 10 ml of heptane was added to compensate for evaporated pentane. The 30 min reaction period at 60° C. with a following addition of 10 ml of heptane was repeated. A clear solution resulted. To this solution 24.2 ml (16.0 mmol) of the Mg-alcoholate complex prepared by method 2 above was added drop by drop at the same temperature and stirring rate as before. The addition took 21 min. The components were now allowed to react with each other for 30 min at the same temperature and stirring rate as before. After this, stirring speed was increased to 410 rpm and 0.96 ml (8.7 mmol) of titaniumtetrachloride added drop by drop. The addition took 3 min. The components were allowed to react with each other for 2 h, using 410 rpm as stirring speed and 60° C. as temperature. After reacting, stirring was stopped and the catalyst allowed to settle where after the supernatant is siphoned off. After this 30 ml of pentane was added and the catalyst was washed in this solution at room temperature for 30 min. When the washing was completed, the catalyst was allowed to settle, and the wash solution was siphoned off after which 20 ml of pentane was added to the catalyst to create the final catalyst slurry that was used in the test polymerisations.

Examples 9, 10 and 11

Examples 9, 10 and 11 were done as example 8, but with some slight variations in the molar proportions of the added chemicals. The molar proportions are listed in Table 5.

Example 12

Example 12 was done as example 10 with the exception that no pentane wash was carried out. The molar proportions are listed in Table 5.

All catalysts of examples 8 to 12 were used in co-polymerisations according to the procedure of examples 1 to 7.

TABLE 5

The molar proportions of the chemicals added in the catalyst synthesis.

| Catalyst | $Et_2AlCl$ | 2-ethyl-hexanol | $Mg(OR)_2$ | $TiCl_4$ |
|---|---|---|---|---|
| Example 8 | 2.1 | 2.1 | 1 | 0.54 |
| Example 9 | 2.1 | 1.55 | 1 | 0.53 |
| Example 10 | 2.1 | 0 | 1 | 0.53 |
| Example 11 | 2.1 | 1.1 | 1 | 0.53 |
| Example 12 | 2.1 | 1.1 | 1 | 0.53 |

The Chemical Composition of the Catalysts

In Table 6 below the chemical composition of the catalysts is disclosed in w-% units. The relative oxidation stage set up of $Ti^{4+}$, $Ti^{3+}$ and $Ti^{2+}$ is also listed in Table 6.

TABLE 6

The chemical composition of catalyst examples 8 to 12.

|  | Ex 8 | Ex 9 | Ex 12 | Ex 10 | Ex 11 |
|---|---|---|---|---|---|
| Al, w-% | 1.03 | 0.54 | 2.48 | 0.66 | 0.79 |
| Mg, w-% | 0.62 | 0.39 | 1.19 | 0.57 | 0.83 |
| Ti, w-% | 0.47 | 0.28 | 1.03 | 0.46 | 0.45 |
| Cl, w-% | 2.94 | 1.96 |  | 2.73 | 2.92 |
| Ti2+ | 0.06 | 0.06 | 0.27 | 0.11 | 0.09 |
| Ti3+ | 0.21 | 0.04 | 0.3 | 0.1 | 0.21 |
| Ti4+ | 0.2 | 0.18 | 0.46 | 0.26 | 0.14 |
| Ti2+ | 12 | 21 | 26 | 22 | 21 |
| Ti3+ | 45 | 15 | 29 | 22 | 47 |
| Ti4+ | 43 | 64 | 45 | 56 | 32 |

In table 7 the chemical composition in respect of Ti content in the catalyst are disclosed in molar ratios.

TABLE 7

Molar ratios of catalyst components

|  | Ex 8 | Ex 9 | Ex 12 | Ex 10 | Ex 11 |
|---|---|---|---|---|---|
| Ti | 1 | 1 | 1 | 1 | 1 |
| Mg | 2.6 | 2.74 | 2.28 | 2.44 | 2.76 |
| Al | 3.89 | 3.42 | 4.27 | 2.55 | 3.12 |
| Cl | 8.45 | 9.45 |  | 8.02 | 8.76 |

The results from the chemical characterisation showed that the Mg/Ti molar ratio was quite constant in all the catalysts, i.e. showing a value between 2.5-2.7. A clear change in the Al/Ti molar ratio was caused by the wash, i.e. if no wash had been carried out, then a higher Al/Ti molar ratio was achieved. The Al/Ti molar ratio exceeded then 4.

Polymerisation Results

Co-polymerisations were done using catalysts of examples 8 to 12. Results are listed in Table 8 and marked as 8C to 12C respectively.

TABLE 8

The Co-polymerisation results

|  | Example | | | | |
|---|---|---|---|---|---|
|  | 8C | 9C | 12C | 10C | 11C |
| Activ: kgEB/g · Ti · hr | 96 | 343 | 136 | 250 | 346 |
| $MFR_5$ | 0.72 | 0.49 | 1.6 | 0.5 | 1.06 |
| $MFR_{21}$ | 7.2 | 5.21 | 21.63 | 4.8 | 12.4 |
| FRR(21/5) | 10.0 | 10.6 | 13.5 | 9.3 | 11.7 |
| $C_4''$/w-% | 2.8 | 2.8 | 4.3 | 4.1 | 4 |
| MWD | 3.2 | 3.1 | 3.7 | 3.3 | 3.4 |
| Dens kg/m³ | 926.9 | 925.9 | 920.8 | 922.3 | 922.5 |
| XS, w-% | 0.42 | 0.42 | 4.3 | 4.5 | 4 |
| Tm ° C. | 120.6 | 121.0 | 120.4 | 120.4 | 120.8 |
| DSC, % cryst. | 46.7 | 45.3 | 42.3 | 42.3 | 42.9 |
| Al/Ti in polymeris. | 22 | 27 | 6 | 8 | 10 |

The un-washed catalyst, Example 12C, where Al/Ti ratio was over 4 in the catalyst, showed clear indications of broadening of the molecular weight distribution. Thus, if it is desired to have polymers with more narrow MWD, then Al/Ti ratio should not exceed 4.

COMPARATIVE EXAMPLES

Comparative Example 1

A 150 ml glass reactor was used for both the precipitation of the $MgCl_2$ support material as well as for the titanation of the catalyst. To improve the mixing efficiency buffels were fixed on the inner walls of the reactor just above the propeller blades.

Preparation of the Mg-Alcoholate

The Mg-alcoholate was prepared in the same manner as in the examples of the invention. Analyses showed that the Mg-alcoholate complex had a concentration of 2.4 w-% Mg.

Preparation of the $MgCl_2$ Support Material:

A 19.5 w-% EADC solution in n-pentane was used in the comparison experiment. 25 ml (17.09 g, 0.171 mol) of heptane ($C_7$) was first added to the reactor. Then 23.2 mmol of the 19.5% pentane solution of $EtAlCl_2$ was added. Mixing speed was increased to 460 rpm to create a good precipitation conditions. Temperature was adjusted to +10° C. and the temperature was kept at this level trough out the time the Mg-alcoholate solution was added to the reactor. 23.5 g (23.2 mmol Mg) of the Mg-complex solution was then added drop by drop with a syringe during 27-30 min into the reaction solution at room temperature. After this the temperature was allowed to rise slowly during 30 min to 18° C. and after that to 60° C. where the reactants were allowed to react with each other for 30 min. After this, mixing was stopped and the precipitate was allowed to settle. When no settling could any longer be observed the liquid was carefully siphoned off the precipitate. A sample was taken from the siphoned off liquid for analysis of Mg and Al. The precipitate was then washed with 20 ml (13.7 g, 0.137 mol) of heptane at 60° C. for 20 min. After washing the carrier was allowed to settle, and the clear wash solution was siphoned off. A sample was taken from the wash solution for Mg analysis.

Preparation of the Comparative Catalyst

A new carrier-heptane slurry was created by adding 20 ml (13.7 g, 0.137 mol) of heptane to the reactor. To this slurry 1.18 ml (2.037 g, 10.74 mmol) of $TiCl_4$ and 21.5 mmol of the Mg carrier were added. The Ti/Mg molar ratio was 0.5/1. The temperature was increased to 60° C. and the reactants were allowed to react with each other for 30 min. After reaction and settling the liquid was drawn off, and the catalyst was washed two times with 40 ml (27.4 g, 0.274 mol) portions of heptane at 60° C. for 20 min with a mixing speed of 460 rpm. Finally 35 ml of the wash heptane was siphoned off, and the catalyst was taken for test polymerisation.

Co-Polymerisation

The catalyst prepared in the Comparative example 1 was used in copolymerisation, which was carried out in the same manner as in examples of the invention. The resulting co-polymer had a butene content of 3.0 w-%, a molecular weight broadness of 4.1 (MWD) and an XS of 2.1 w-%.

Comparative Example 2

A commercial PE ZN catalyst (Lynx 200) from Engelhard, Pasadena, Tex. was test polymerised in the same co-polymerisation conditions as described above. The resulting co-polymer had a butane content of 3.4 w-%, a molecular weight broadness of 4.4 (MWD) and an XS of 1.9 w-%.

It can be noted that copolymers from comparative examples have a clearly higher XS and also have a broader MWD compared to the results of the invention with the same butane comonomer contents.

The invention claimed is:

1. A process for producing a Ziegler-Natta catalyst for olefin polymerization by reacting in solution a soluble magnesium complex containing aluminum, with a halogen containing compound of a transition metal of Group 4 to 10 of the Periodic Table (IUPAC), characterized in that after adding said transition metal compound into the solution of said soluble magnesium complex containing in addition to Mg and aluminum, also (OR0, $R_1$ and X, where each $R_1$ are independently a $C_{2-15}$ hydrocarbon group, and X is chlorine, the molar ratio of Al/Mg in the soluble complex is in the range of 1.5 to 2.5, and a solid catalyst complex comprising as essential components Mg, said aluminum and said transition metal compound is formed, which solid catalyst complex is recovered from the solution; wherein the soluble magnesium complex is provided by forming a washing solution by separating a solid $MgCl_2$ support from a reaction mixture and optionally washing the solid $MgCl_g$ support with a solvent.

2. A process according to claim 1, characterized in that the soluble magnesium complex has the general formula (I) $[R_1—Al(OR_1)_2]_a$ $[MgCl_2]_b$, where the ratio a/b is 1.5 to 2.5.

3. A process according to claim 1, characterised in that said transition metal compound is a tetravalent titanium compound.

4. A process according to claim 3, characterized in that said soluble Mg complex is reacted with said tetravalent titanium compound at a temperature of 10-70° C., whereby a solid insoluble catalyst complex of components Ti, Al, $Mg(OR_1)$ $R_1$, and X is formed.

5. A process according to claim 1, characterized in that said solid catalyst complex has the general formula $[MgCl_2]_x$ $(TiCl_4)$ $[R_1\ Al(OR_1)_2]_y$, where each $R_1$ independently is as defined above and x is 0.5 to 2 and y is 1 to 2, and Et denotes a hydrocarbon group of two carbon atoms.

6. A process according to claim 1, characterised in that $TiCl_a$ is added to said solution of soluble Mg complex in an amount, where the molar ratio of Ti/Mg is in the range of 0.1 to 3.0.

7. A process according to claim 1, characterized in that in the catalyst complex the Al/Ti ratio is in the range of 0.2 to 4.0.

8. A process according to claim 1, characterized in that in the catalyst complex the Mg/Ti ratio is in the range of 0.5 to 5.

9. A process according to claim 1, characterized in that said solid $MgCl_2$ support is prepared by the steps of:
  i) contacting (a) a solution of a magnesium hydrocarbyloxy compound of formula (II) Mg $(OR_1)_{2-n-x}$ $(R_1)_n X_x$ (II), wherein each $R_1$ independently represents a $C_{1-20}$ hydrocarbyl group; X is a halogen; $0 \leq n < 2$ and may or may not be an integer; $x < 2$ and may or may not be an integer; the sum of (2−n), n and x is 2 with (b) a solution of a halogen-containing compound of aluminum to form the reaction mixture; and
  ii) recovering the solid $MgCl_2$ support from the reaction mixture.

10. A process according to claim 1, characterised in that the soluble Mg complex is produced by a reaction of Mg-alcoholate and a halogen-containing compound of aluminum.

11. A process according to claim 10, characterized in that the halogen-containing compound of aluminium is an alkyl aluminium halide compound.

12. A process according to claim 9, characterized in that the solid $MgCl_2$ support is washed with an inert hydrocarbon selected from a linear or branched aliphatic, alicyclic or aromatic $C_{5-20}$ hydrocarbon or any mixtures thereof.

13. A process according to claim 9, characterized in that the halogen-containing compound of aluminum is a compound of formula $Al(R_1)_x X_{3-x}$ (IV), wherein each $R_1$ independently represents a $C_{1-20}$ hydrocarbyl group; X is chloride and $0 \leq x < 3$.

14. A process according to claim 13, characterized in that the compound of formula (IV) is ethylaluminium dichloride.

15. A process for producing an ethylene copolymer, comprising using the catalyst component produced according to claim 1.

16. A process according to claim 15, characterized in that the ethylene copolymer is an ethylene-butene copolymer.

17. A process according to claim 16, characterized in that the ethylene-butene copolymer has a butylene content of 2 to 5 wt-% and a molecular weight distribution of less than 4.

18. A Ziegler-Natta catalyst produced according to claim 1.

19. A process for producing a Ziegler-Natta catalyst for olefin polymerization, comprising:

forming a solid support from a reaction mixture containing
(a) a halogen-containing compound of aluminum and
(b) a magnesium hydrocarbyloxy compound of Formula (II):

$$Mg(OR_1)_{2-n-x}(R_1)_n X_x \qquad \text{Formula (II)}$$

wherein each $R_1$ is independently a $C_{1-20}$ hydrocarbyl group, each X is independently a halogen, $0 \leq x < 2$, and $0 \leq n < 2$;

obtaining a washing solution containing soluble Mg complex by separating the solid support from the reaction mixture and optionally washing the solid support with a solvent; and reacting the soluble Mg complex in the washing solution with a transition metal compound of Group 4 to 10 of the Periodic Table to produce the Ziegler-Natta catalyst.

20. The process of claim 19, wherein the washing solution is the remainder of the reaction mixture after recovering the solid support.

21. The process of claim 19, wherein the washing solution is obtained by separating the solid support from the reaction mixture; and washing the solid support with a solvent to obtain the washing solution.

* * * * *